United States Patent
Soh et al.

(10) Patent No.: US 12,511,719 B2
(45) Date of Patent: Dec. 30, 2025

(54) IMAGE PROCESSING DEVICE FOR IMAGE DENOISING

(71) Applicant: Samsung Electronics Co., Ltd., Suwon-si (KR)

(72) Inventors: Jae Woong Soh, Seoul (KR); Yeong Il Jang, Namyangju-si (KR); Nam Ik Cho, Seoul (KR)

(73) Assignees: Samsung Electronics Co., Ltd., Suwon-Si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 745 days.

(21) Appl. No.: 17/741,068

(22) Filed: May 10, 2022

(65) Prior Publication Data
US 2022/0375039 A1    Nov. 24, 2022

(30) Foreign Application Priority Data

May 13, 2021   (KR) ........................ 10-2021-0062113
Aug. 4, 2021   (KR) ........................ 10-2021-0102630

(51) Int. Cl.
  *G06T 5/70*    (2024.01)
  *G06T 1/20*    (2006.01)
  *G06T 9/00*    (2006.01)

(52) U.S. Cl.
  CPC .................. *G06T 5/70* (2024.01); *G06T 1/20* (2013.01); *G06T 9/002* (2013.01); *G06T 2207/20076* (2013.01); *G06T 2207/20081* (2013.01); *G06T 2207/20084* (2013.01)

(58) Field of Classification Search
  CPC .. G06T 5/70; G06T 1/20; G06T 9/002; G06T 2207/20076; G06T 2207/20081; G06T 2207/20084
  See application file for complete search history.

(56) References Cited

U.S. PATENT DOCUMENTS

| 10,043,243 | B2 * | 8/2018 | Matviychuk ............. G06T 5/60 |
| 10,726,525 | B2 | 7/2020 | El-Khamy et al. |
| 2018/0357753 | A1 * | 12/2018 | Lehtinen ................ G06N 3/045 |
| 2019/0066268 | A1 * | 2/2019 | Song ..................... G06N 3/045 |
| 2020/0097772 | A1 | 3/2020 | Nakanishi et al. |
| 2021/0104021 | A1 | 4/2021 | Sohn et al. |
| 2023/0154055 | A1 * | 5/2023 | Besenbruch .......... G06N 3/045 375/240.03 |
| 2024/0095499 | A1 * | 3/2024 | Lee ....................... G06N 3/045 |

FOREIGN PATENT DOCUMENTS

| AU | 2024201093 A1 * | 11/2024 | ............. G06T 17/20 |
| KR | 20050031210 A | 4/2005 | |
| KR | 20170040983 A | 4/2017 | |
| KR | 20190058285 A | 5/2019 | |
| KR | 102095132 B1 | 3/2020 | |
| KR | 102191736 B1 | 12/2020 | |
| KR | 20210036692 A | 4/2021 | |

\* cited by examiner

*Primary Examiner* — Pinalben Patel
(74) *Attorney, Agent, or Firm* — Fish & Richardson P.C.

(57) ABSTRACT

An image processing device includes an encoder which infers latent variables from an input noisy image based on a preset noise. A denoiser removes the noise from the input noisy image to generate a denoising image. A decoder reconstructs a noisy image, using the inferred latent variable. The latent variables are learned on the basis of a difference between the reconstructed noisy image and the input noisy image.

19 Claims, 6 Drawing Sheets

IMAGE PROCESSING DEVICE FOR IMAGE DENOISING

This application claims priority under 35 U.S.C. § 119 to Korean Patent Application No. 10-2021-0062113 filed on May 13, 2021, and No. 10-2021-0102630 filed on Aug. 4, 2021, in the Korean Intellectual Property Office, the disclosures of which are incorporated by reference herein in their entireties.

BACKGROUND

1. Field of the Disclosure

The present disclosure relates to a method for removing image noise with an image processing device.

2. Description of the Related Art

If an image acquired by an image device is damaged by unavoidable noise, the image processing device needs to reconstruct the image from the acquired image into a denoised image. The unavoidable noise generally means that various noises are accumulated from a source such as image processing of the image device and acquisition from an image sensor. Therefore, it is difficult to accurately model a noise generation process, and the noise is generally assumed to be an additive white Gaussian noise (AWGN) according to a central marginal theory.

In recent years, a convolutional neural network (CNN) has been widely used to remove AWGN from acquired images. However, conventional CNN-based image denoising methods are primarily non-blind methods, and such image processing methods require separate models trained to correspond to various noises.

Also, if the input image has a level of noise different from the trained image, performance degradation may occur due to domain discrepancy between training data consisting of an image including only a predetermined level of noise and a test image. This phenomenon may degrade reliability and limit an actual scope of application.

SUMMARY

Aspects of the present disclosure provide an image processing device that performs image denoising capable of coping with a wide range of noise levels by a single neural network.

Aspects of the present disclosure also provide an image processing device for performing image denoising, which includes a flexible convolutional neural network applicable to various noise levels, even without additional information about noise.

Some embodiments of the present disclosure provide the image processing device including an encoder which infers latent variables from an input noisy image based on a preset noise, a denoiser which removes the noise from the input noisy image to generate a denoising image and a decoder which reconstructs a noisy image, using the inferred latent variable, wherein the latent variables are learned on the basis of a difference between the reconstructed noisy image and the input noisy image.

Some embodiments of the present disclosure provide the image processing device including an image sensor which senses a first input image, a neural processor which includes a plurality of convolutional neural networks and removes noise of the first input image and a memory which stores instructions that may be executed by the neural processor. The neural processor infers latent variables on the basis of the first input image, using an encoding convolutional neural network, and the neural processor removes the noise based on the inferred latent variables by the use of a denoising convolutional neural network to generate a first denoising image.

Some embodiments of the present disclosure provide a processor and a memory which stores instructions that may be executed by the processor. The processor is configured to set a noise, infer noise information from the input noisy image, remove the noise based on the inferred noise information from the input noisy image to generate a denoising image, and generate a reconstructed noisy image based on the inferred noise information.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

DETAILED DESCRIPTION OF THE EMBODIMENTS

Unless otherwise defined, all terms used herein (including technical and scientific terms) may be used in the meaning that can be commonly understood by those having ordinary knowledge in the art to which the present disclosure belongs. Also, terms commonly used and defined in dictionaries are not interpreted ideally or excessively unless definitely and specifically defined.

A unit model blind denoising method may deal with various levels of noises included in an input image to remove the noises. However, the unit model blind denoising method is generally inferior in performance to a non-blind denoising method fitted to a preset range of noise levels. This is because conditional mapping between noisy images with various noise levels and denoised images is more difficult than training in a case of having noise levels concentrated at a particular level. The unit model blind denoising method may be referred to as a naïve blind model according to various embodiments.

Another approach method may consider development of a flexible network that may process various noise levels, by utilizing additional information. In this case, a noise level estimation is required together with a Convolutional Neural Network (CNN) that performs denoising. That is, a two-stage model that utilizes a noise level estimation step and a denoising CNN according to the estimation noise level may be considered. However, the two-stage model may not work properly if the noise level estimation does not provide accurate information.

The real noise level distribution deviates significantly from the distribution assumed in the model design, for example, a Gaussian distribution. In particular, there are two drawbacks. One is that it is difficult to implement a noise dataset that is made up of pairs and denoised to eliminate the real noise. Since the real-noise distribution has more complex characteristics than Gaussian noise (e.g., multimode, signal dependence, spatial variants, etc.), it is difficult to perform accurate modeling of noise.

The second drawback is efficient learning of data. Real-noise has a great variety of forms of noise. Not only the noise intensity, but also the noise distribution are very diverse and appear differently. (For example, they may differ depending on the camera (hardware), depending on the camera settings, and depending on the shooting environment.) It is very difficult to learn the conditional probability distribution of such a complicated form.

Therefore, the present disclosure provides an image denoising method that divides a complex distribution of a noisy image into simpler sub-distributions and performs CNN denoising according to the sub-distributions. The present disclosure also provides an image denoising method that performs a single CNN-based blind image denoising without adding additional information and an image processing device thereof.

In the following description, the denoising image is expressed by x, the noisy image is expressed by y, and the data distribution is expressed by $p_{data}$. It is assumed that the image data includes N subordinate data.

Further, in the following description, the conditional probability distribution and an expected value of the probability distribution will be mainly described. For example, p(x|y) is a conditional density function, and means the distribution of a random variable x assuming a random variable y. For example, E[•] means an expected value in [ ].

Figure 1A:
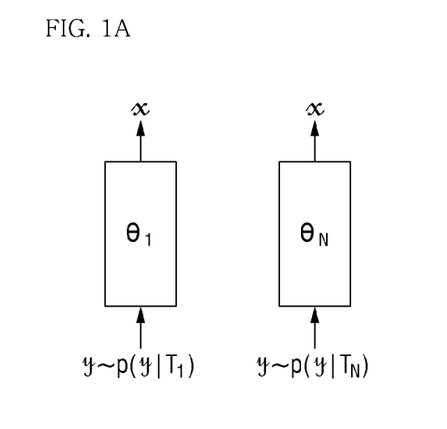
FIG. 1A is a conceptual diagram for explaining a specific non-blind model.
Figure 1B:
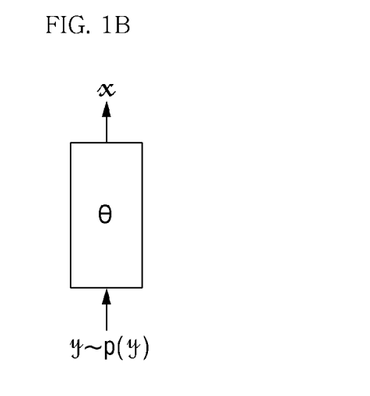
FIG. 1B is a conceptual diagram for explaining a naïve blind model.
Figure 1C:
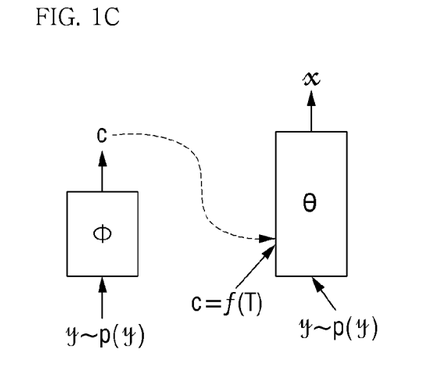
FIG. 1C is a conceptual diagram for explaining a two-stage blind model.

FIGS. 1A to 1C are conceptual diagrams for explaining various comparative examples of a method for perform the image denoising on a CNN basis.

The image denoising method may be divided into three categories, for example. As an example, it may be divided into a non-blind model, a naïve blind model, and a two-stage blind model.

FIG. 1A is a conceptual diagram for explaining a specific non-blind model.

The specific non-blind model includes separate networks trained at the specified noise level. In this case, the specified noise level includes a noise level intended in the image processing device, i.e., within a preset range. The specific non-blind model may include, for example, DnCNN-S, RED, NLRN and the like. A specific non-blind model may be expressed as Formula 1.

$$\hat{\theta}_i = \arg\max_{\theta_i} \mathbb{E}_{p_{data}(x,y,\sigma_N^i)}[\log p_{\theta_i}(x \mid y, \sigma_N^i)]. \qquad \langle\text{Formula 1}\rangle$$

In Formula 1, $\theta_i$ represents an i-th network parameter. The noise level included in the image data in the i-th network is limited to each of the N networks in which a standard deviation $\sigma_N^i$ is specified.

For example, it is assumed that a standard deviation element of the noise level in a first convolutional neural network $\theta_1$ is $\sigma_N^1=15$, and the standard deviation element of the noise level in a second convolutional neural network $\theta_2$ is $\sigma_N^2=25$. The specific non-blind model may perform appropriate image denoising when a noisy image of that noise level is input.

The specific non-blind models may perform the image denoising if the current noise level belongs to any one of the specified networks. However, in order to apply a specific non-blind model, there is a need for noise level information of the test image. Also, because real-world noise levels vary, in order to apply a specific non-blind model, many networks need to be prepared to cover different noise level ranges. Accordingly, there is a problem that the memory size increases to store the networks.

FIG. 1B is a conceptual diagram for explaining a naïve blind model.

Referring to FIG. 1B, most blind denoisers belong to the category of naïve blind models, while being entirely based on the expressiveness of CNN. In particular, in the case of real-noise, since it is very difficult to know the noise level, denoising may be performed with a naïve blind model expressed as in Formula (2).

$$\hat{\theta} = \arg\max_{\theta} \mathbb{E}_{p_{data}(x,y)}[\log p_\theta(x \mid y)] \qquad \langle\text{Formula 2}\rangle$$

The naïve blind model is trained in a single parameterized network to capture the conditional distribution of noise levels. That is, the naïve blind model performed at all noise levels. In this case, since the noise level distribution p(x|y) of the naïve blind model is more complex than the noise level distribution p(x|y, $\sigma_N$) of the specific non-blind model, the naïve blind model has inferior performance to the specific non-blind model. Examples of naïve blind models include DnCNN-B, UNLNet, GCBD, RIDNet, and the like.

FIG. 1C is a conceptual diagram for explaining a two-stage blind model.

Referring to FIG. 1C, the two-stage blind model primarily infers the noise level parameter c and secondarily performs image denoising with the network. The two-stage blind model may be expressed as Formulas 3 and 4.

$$\hat{\phi} = \arg\max_{\phi} \mathbb{E}_{p_{data}(y,c)}[\log p_\phi(c \mid y)] \qquad \langle\text{Formula 3}\rangle$$

$$\hat{\theta} = \arg\max_{\theta} \mathbb{E}_{p_{data}(x,y,c)}[\log p_\theta(x \mid y, c)]] \qquad \langle\text{Formula 4}\rangle$$

That is, in Formula (3), Ø means the parameters of the noise estimator, and the Formula (3) is modeled to select the network having c that allows the distribution probability $p_\emptyset(c|y)$ to have a max expectation in the parameter c of the two-stage blind model in the noisy image y.

In Formula 4, θ means the parameters of the denoiser, and Formula 4 models the network to infer the denoising image x that allows the distribution probability $p_\theta(x|y, c)$ to have max expectation by c given by Formula 3 when noise is removed from the noisy image y and generated as a denoising image x in the selected network.

In order to apply this two-stage blind model, there is a need to select parameter c of the noise level that is already known, such as Gaussian noise. However, since the parameter c of the real-world noise level is more complex than Gaussian noise, it is difficult to apply the two-stage blind model without additional information.

When assuming that the noisy image is y and the denoising image is x, the maximum posterior probability MAP (Maximum A Posterior) may be inferred as in Formula 5.

$$\hat{x}=\arg\max_x \log p(x|y) \qquad \text{<Formula 5>}$$

In Formula (5), $\hat{x}$ means a component that maximizes the probability of the denoising image x to the noisy image y. In this case, Formula 5 may be rearranged by being divided into a likelihood function and a prior probability as in Formula 6.

$$\text{argmax}_x \log p(x|y) = \qquad \text{<Formula 6>}$$
$$\text{argmax}_x \log p(y|x) + \log p(x) = \text{argmin}_x \frac{1}{2\sigma^2}\|y-x\|_2^2 + \Phi(x)$$

Formula 6 divides $\arg\max_x \log p(x|y)$ into a likelihood function $$\text{argmin}_x \frac{1}{2\sigma^2}\|y-x\|_2^2$$

and a prior probability $\Phi(x)$ in the case of Gaussian noise and may be rewritten as Formula for the parameters $\Phi(x)$ of the noise estimator described above.

However, as described above, even with the Formula (6), since the real-world noise level is more complicated and diverse than the Gaussian noise, there is a problem that there is a need for additional information about the noise level.

Figure 2:
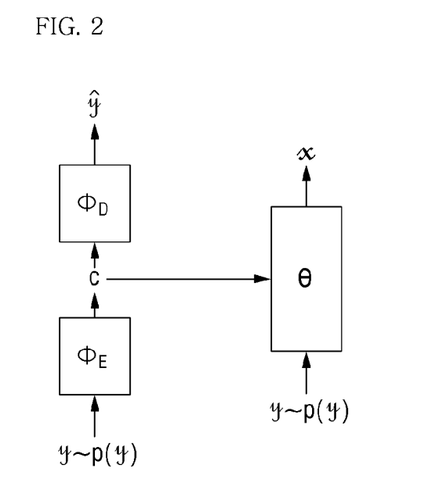
FIG. 2 is a conceptual diagram for explaining the image denoising method according to the embodiment of the present disclosure.
Figure 3:
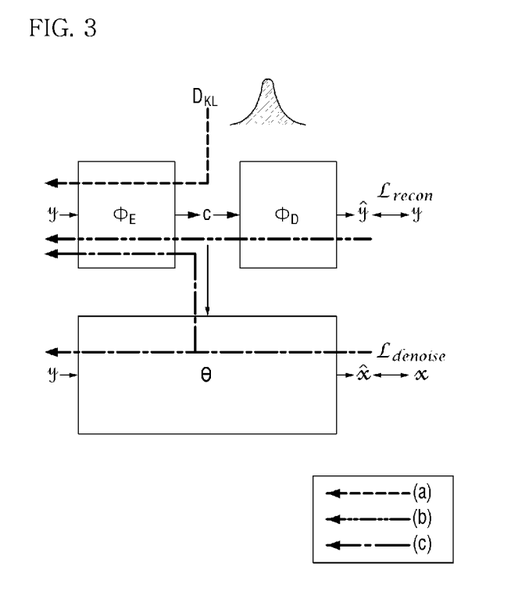
FIG. 3 is a conceptual diagram for more specifically explaining the image denoising method of FIG. 2.

FIG. 2 is a conceptual diagram for explaining the image denoising method according to the embodiment of the present disclosure, FIG. 3 is a conceptual diagram for more specifically explaining the image denoising method of FIG. 2.

In order to assume a posterior probability distribution p(c|x, y), some embodiments of the present disclosure assume and explain a tractable probability function q(c|y). A joint log-probability distribution log p(x, y) between the noisy image y and the denoising image x may be expressed as in Formula (7).

$$\log p(x,y)=\mathbb{E}_{c\sim q(c|y)}[\log p(x|y,c)]+D_{KL}(q(c|y)\|p(c|x,y))-D_{KL}(q(c|y)\|p(c))+\mathbb{E}_{c\sim q(c|y)}[\log p(y|c)] \qquad \text{<Formula 7>}$$

At this time, in Formula (7), $D_{KL}( )$ means Kullback-Leibler divergence. The Kullback-Leibler divergence is a function used to calculate a difference between two probability distributions and calculates an information entropy difference which may occur when sampling is performed using another distribution that approximates a certain ideal distribution. For example, $D_{KL}(q(c|y)\|p(c|x, y))$ means a value obtained by subtracting entropy of q(c|y) from cross entropy of q(c|y) and p(c|x, y). That is, it represents a difference in distribution between q(c|y) and p(c|x, y).

In Formula 7, $\mathbb{E}_{c\sim q(c|y)}[\log p(x|y, c)]$, $D_{KL}(q(c|y)\|p(c))$, and $\mathbb{E}_{c\sim q(c|y)}[\log p(y|c)]$ are values that can be learned by training, respectively. However, in the case of $D_{KL}\left(q\left(c\left|\begin{array}{c}r\\y\end{array}\right)\right)\middle|\middle| p(c\,|\,x,\,y)\right)$, it is difficult to obtain the noise level itself included in the noisy image, that is, p(c|x, y). If a variational lower bound L is defined as in the Formula (8) to approximate the untraceable Formula (7), the variational lower bound L becomes a lower bound of the coupling probability distribution log p(x, y).

$$\mathcal{L}=\mathbb{E}_{c\sim q(c|y)}[\log p(x|y,c)]-D_{KL}(q(c|y)\|p(c))+\mathbb{E}_{c\sim q(c|y)}[\log p(y|c)] \qquad \text{<Formula 8>}$$

When the coupling probability distribution log p(x|y) of the Formula (7) is summarized on the basis of the Formula (8), it may be summarized as the Formula (9).

Because $D_{KL}(q(c|y)\|p(c|x, y))\geq 0$ is obtained due to the characteristics of the KL divergence, the lower bounds of log p (x, y) are the variational lower bound L, which may each be expressed by tracable random variables. Accordingly, it may be learned with a CNN-based model through this.

$$\log p(x,y)=\mathcal{L}+D_{KL}(q(c|y)\|p(c|x,y)) \qquad \text{<Formula 9>}$$

That is, since log p(x|y) is the sum of $\mathcal{L}$ and $D_{KL}(q(c|y)\|p(c|x, y))$, log p(x|y) may have equal or greater values than the variational lower bound $\mathcal{L}$ as in Formula 10. At this time, the problem of maximizing log p (x, y) may approximate the problem of maximizing the variational lower bound L, when being based on the probability characteristics (e.g., the sum of all probabilities in the same data set is 1).

$$\log p(x,y)\geq \mathcal{L} \qquad \text{<Formula 10>}$$

On the other hand, in Formula 7, since it is difficult to know p(c|x, y) that derives only the latent variable c, which is a noise component, from the noisy image y and the denoising image x. Therefore, an arbitrary q(c|y) is defined by log posterior probability for this purpose. q(c|y) may be set to an easily tractable probability distribution, for example, a Gaussian probability distribution. The posterior probability distribution q(x|y) to be finally obtained is the probability distribution of the denoising image x with respect to the noisy image y, and when rearranged as the Formula of the Formula (7), it is defined as the Formula (11).

$$q(x|y)=\int_c q(x,c|y)dc=\int_c p(x|y,c)q(c|y)dc \qquad \text{<Formula 11>}$$

When an objective noisy image is given in Formula 11, the probability value of the denoising image, that is, MAP, may be determined from p (x|y, c) and q (c|y) learned from Formula 8.

In Formula 8, the first term $E_{c\sim q(c|y)}[\log p(x|y, c)]$ of the variational lower bound $\mathcal{L}$ is a Formula relating to the denoising image x when the noisy image y and the latent variable c are given in the denoising and image reconstruction. That is, it is the only Formula involved in the denoising image x.

However, the remaining components of the variational lower bound $\mathcal{L}$ relate to the latent variable c, the second term $D_{KL}(q(c|y)\|p(c))$ is the KL divergence that limits the latent distribution, and the third term $E_{c\sim q(c|y)}[\log p(y|c)]$ of the variational lower bound $\mathcal{L}$ is a formula about an auto-encoder reconstruction of the noisy image y.

Referring to FIG. 2, each term of the Formula 8 explained above is learned as each of the three divided convolutional neural networks $\theta$, $\emptyset_E$, $\emptyset_D$. At this time, ($\theta$, $\emptyset_E$, $\emptyset_D$) is a denoising convolutional neural network parameter, an encoding convolutional neural network parameter, and a parameter of decoding convolutional neural network, respectively. Assuming that training data $p_{data}(x, y)$ is given to determine the latent variable c for the noise level, the image denoising method according to some embodiments may derive Formula 12 which is a final objective function of log p(x|y), using the training data $p_{data}(x, y)$ having an empirical data distribution.

$$\arg\max\nolimits_{\theta,\emptyset_E,\emptyset_D} \mathbb{E}_{p_{data}(x,y)} \left[ \mathbb{E}_{c \sim q_{\emptyset_E}(c|y)} \log p_\theta(x \mid y, c) \right] - \quad \text{<Formula 12>}$$
$$D_{KL}(q_{\emptyset_D}(c \mid y) \mid\mid p(c)) + \mathbb{E}_{c \sim q_{\emptyset_E}(c|y)} \log p_{\emptyset_D}(y \mid c)$$

The first term $$\arg\max\nolimits_{\theta,\emptyset_E,\emptyset_D} \mathbb{E}_{p_{data}(x,y)} \mid \mathbb{E}_{c \sim q_{\emptyset_E}(c|y)} [\log p_\theta(x \mid y, c)]$$

of Formula 12 applies MAE (mean absolute error) to minimize the distortion between the denoising image x and the inferred output y. When rewritten as a loss, the objective function θ of the first term relates to the image denoising, which uses an L1 loss of a Laplacian distribution as in Formula 13 to maximize a peak signal-to-noise ratio (PSNR).

$$\mathcal{L}_{denoise} = \|x - \hat{x}\|_1 \quad \text{<Formula 13>}$$

The prior probability distribution of the latent variable c is assumed to be a normal distribution N(0,1) of Formula 14. At this time, the objective function $\emptyset_E$ corresponding to the second term of Formula (12) is a KL divergence, which is expressed as in the Formula (14).

$$D_{KL}(q(c|y) \| p(c)) = D_{KL}(\mathcal{N}(\mu, \Sigma) \| \mathcal{N}(0, I)) \quad \text{<Formula 14>}$$

When using a repraramterization trick for differentiable learning in Formula 14, it is expressed as in Formula 15. Based on Formula 15, the neural network may be learned to predict the average and standard deviation of the latent variable c.

$$D_{KL}(q(c \mid y) \| p(c)) = \frac{1}{2} \left[ \sum_{i=1}^{n} \left( -\log \sum\nolimits_i^2 - 1 + \sum\nolimits_i^2 + \mu_i^2 \right) \right] \quad \text{<Formula 15>}$$

The objective function $\emptyset_D$ of the third term of Formula 12 reconstructs itself from the noisy image y, i.e., generates $\hat{y}$. By restoring itself ($\hat{y}$) and comparing it with the input noisy image y, the latent variable c learns the network so that a MAE (mean absolute error) between the noise input image y and the output of the decoder 300 has a minimum value. In addition, an adversarial loss is adopted so that a JS divergence (Jensen-Shannon divergence) between $p_{data}(x, y)$ and $p_{\emptyset_D}(y|c)$ is minimized.

According to some embodiments, as the objective function $\emptyset_D$ corresponding to the third term, both a loss $\|y - \hat{y}\|_1$ of L1 and the adversarial loss $\lambda_1 \mathcal{L}_{adv}$ of a generative adversarial network (GAN) are used as in Formula 17. In an embodiment, when the prior information may be additionally reflected in the synthetic noisy image (for example, in the case of AWGN), an L1 loss $\lambda_2 \|\sigma_N - \text{EST}(c)\|_1$ that predicts the noise level from the latent variable c via a simple convolutional neural network EST may be added. At this time, EST(•) means a simple two-layer CNN (Conv-ReLU-Conv).

As another embodiment, in the case of a camera noisy image that has no prior information about the real-world noise level, only the L1 loss and the adversarial loss may be used as the objective function $\emptyset_D$.

$$\mathcal{L}_{recon} = \|y - \hat{y}\|_1 + \lambda_1 \mathcal{L}_{adv} + \lambda_2 \|\sigma_N - \text{EST}(c)\|_1 \quad \text{<Formula 16>}$$

When the final objective function of Formula 12 is rearranged as described above, the final loss becomes a weighted sum of Formulas 13, 15 and 16, and the normalized KL divergence may be expressed as in Formula 18 multiplied by an arbitrary weighted value β.

$$\arg\max\nolimits_{\theta,\emptyset_E,\emptyset_D} \mathbb{E}_{p_{data}(x,y)} [\mathcal{L}_{denoise} + \beta D_{KL} + \mathcal{L}_{recon}] \quad \text{<Formula 17>}$$

Referring to FIG. 3, the image denoising method according to some embodiments can efficiently remove noise, using a variational neural network, based on Formulas 12 and 18 described above, even without prior information on the noise level.

That is, the image denoising method may infer a latent variable that is noise information from an input noisy image received from an image sensor using an encoding convolutional neural network and remove noise based on a preset latent variable using the denoising convolutional neural network to generate a denoising image. In addition, the image denoise method may reconstruct the noisy image based on the inferred latent variables, compare the reconstructed noisy image with the real input noisy image, and perform learning to correct the previously inferred latent variables.

Specifically, in order to deal with various noise levels, the image processing device of the present disclosure includes a denoising convolutional neural network θ that denoises from the noisy image y of the learning data to the denoising image x, an encoding convolutional neural network $\emptyset_E$ that encodes the noisy image y to infer a latent variable c in the learning data, and a decoding convolutional neural network $\emptyset_D$ that decodes to reconstruct the noisy image y input as the inferred latent variable c again.

The denoising convolutional neural network θ generates a difference between the real denoising image x and the inferred denoising image $\hat{x}$ as a loss and back-propagates a gradient between the denoising convolutional neural network θ and the encoding convolutional neural network $\emptyset_E$ (FIG. 3, arrow (c)). The encoding convolutional neural network $\emptyset_E$ infers the latent variable c from the input noisy image and the inferred denoising image $\hat{x}$. The decoding convolutional neural network $\emptyset_D$ is reconstructed to a noisy image $\hat{y}$ using the inferred latent variable c. A gradient of the loss to the difference between the reconstructed noisy image $\hat{y}$ and the input noisy image y is back-propagated to the encoding convolutional neural network $\emptyset_E$ and the decoding convolutional neural network $\emptyset_D$ (FIG. 3, arrow (b)) and is reflected in learning the latent variable c that was previously inferred and used.

Figure 4:
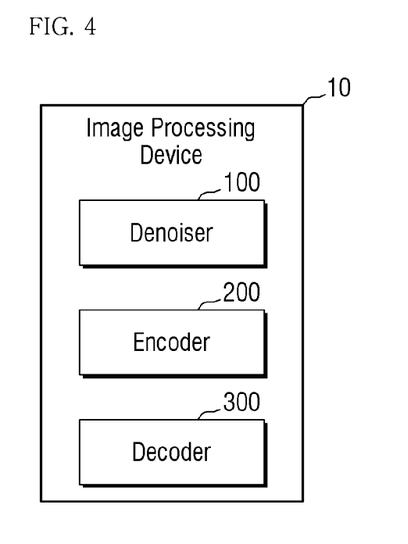
FIG. 4 and FIG. 5 are conceptual diagrams for more specifically explaining the image denoising method of FIG. 3.
Figure 5:
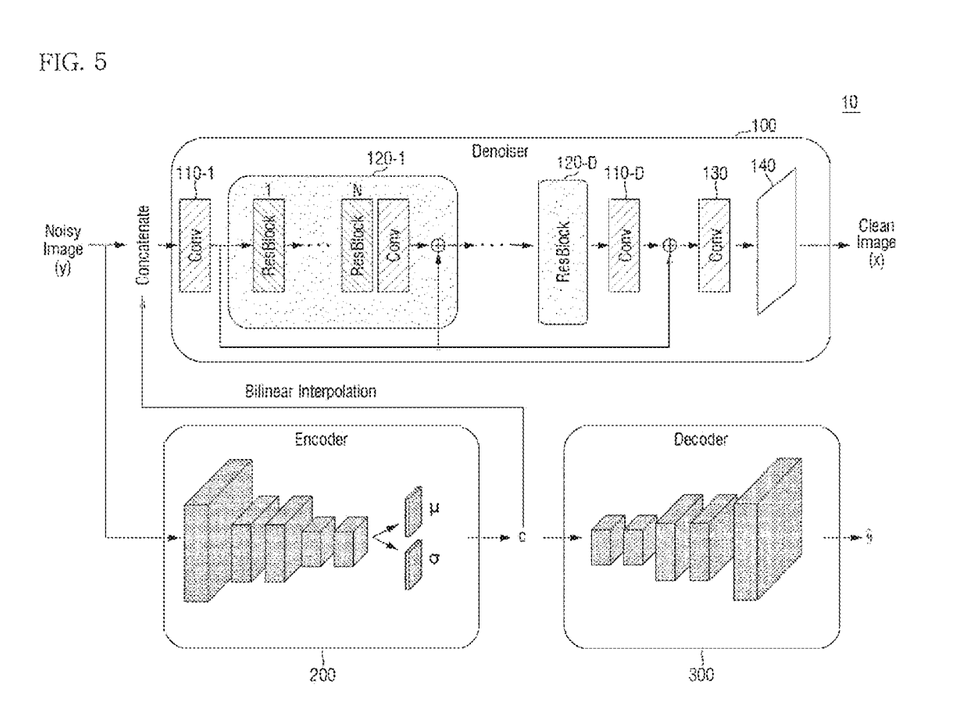

FIG. 4 and FIG. 5 are conceptual diagrams for more specifically explaining the image denoising method of FIG. 3

Referring to FIG. 4 and FIG. 5, the image processing device 10 according to some embodiments includes a denoiser 100, an encoder 200, and a decoder 300.

The denoiser 100 receives the noisy image y having the latent variable c connected along the channel axis to infer the denoising image x. In some embodiments, the denoiser 100 has high expendability as fully convolution.

The denoiser 100 includes D RIR blocks 120-1 to 120-D, and a convolution layer 130.

The RIR block (residual-in-residual block, RIRBlock, 120-1) includes N residual blocks (ResBlock) and one convolution layer 130.

The residual blocks (ResBlock, 1-N) are adopted as basic building blocks. More specifically, a rectified linear unit (ReLU) in which the same residual blocks (ResBlock) are continuously connected in each RIR block 120 is constituted. Like other convolution layers, the rectified linear unit is implemented as a 3×3 convolution layer of sixty-four filters in the order of Conv (110-1)-ReLU-Conv (120-1). After that, the input is added to the output of the convolution class to form a skip connection. The convolution layer 130 infers a residual image (noise, 140) instead of the denoising image x itself. The denoiser 140 operates to correspond to the first objective function described in FIG. 2 or the denoising convolutional neural network θ described in FIG. 3.

The encoder 200 and the decoder 300 may be a simple feedforward convolution network with no skip connection. The encoder 200 and the decoder 300 use a patch discriminator and spectrum normalization that identify the image in patch units of a predetermined size. The patch discriminator determines the authenticity in patch units of the predetermined size.

The encoder 200 reduces the spatial size of the feature map by two times (¼ of the height and width), and the output c has four channels. For a differentiable Monte Carlo, the latent variable c may be calculated as in Formula 18 by applying a reparameterization trick to the input noisy image y.

$$\epsilon \sim \mathcal{N}(0,I), c = \epsilon \odot \sigma + \mu \qquad \text{<Formula 18>}$$

At this time, ⊙ represents Hadamard product, and each of μ and σ may be the output of the encoder 200.

The decoder 300 may be implemented symmetrically with the encoder 200. The decoder 300 may receive the latent variable c from the encoder 200 and reconstruct the noisy image y'.

The encoder 200 operates to correspond to the second objective function described in FIG. 2 or the encoding convolutional neural network $\varnothing_E$ described in FIG. 3. The decoder 300 operates to correspond to the third objective function described in FIG. 2 or the decoding convolutional neural network $\varnothing_D$ described in FIG. 3.

Figure 6:
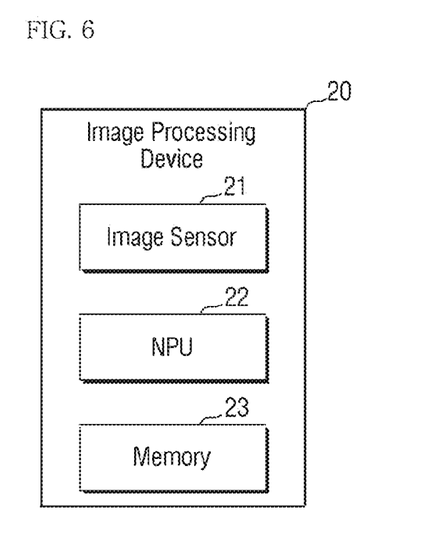
FIG. 6 is a block diagram of some embodiment of an image processing device.

FIG. 6 is a block diagram of some embodiment of an image processing device.

Referring to FIG. 6, the image processing device 10 of FIG. 4 is implemented such as the image processing device 20 of FIG. 6. The image processing device 20 may include an image sensor 21, a neural processing unit 22 and a memory 23.

In some embodiment, the image sensor 21 senses and generates an input image. The neural processor 22 determines noise information from the input image based on a predetermined noise. The memory 23 stores predetermined noise information for generating the predetermined noise. The neural processor 22 removes a noise from the input image and generates an improved image. The neural processing unit 22 reconstructs a noisy image using the predetermined noise information and learns a real noise information from a difference between the reconstructed noise image and the input image. By learning the noise information, the neural processing unit 22 has an advantage that noise removal may be made more efficient even without providing additional information about the noise, when an image degradation occurs.

Figure 7:
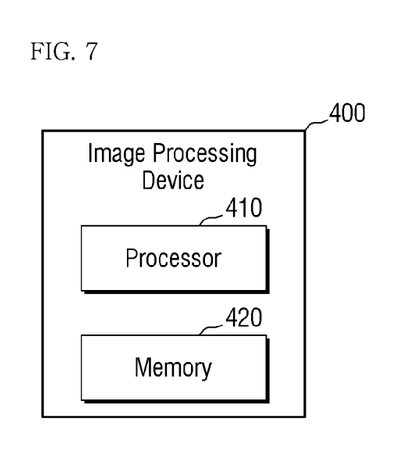
FIG. 7 is a block diagram of some embodiment of an image device.

FIG. 7 is a block diagram of some embodiment of an image device.

Referring to FIG. 7, the image processing device 10 of FIG. 4 is implemented such as the image processing device 400 of FIG. 7. The image processing device 400 may include a processor 410 and a memory 420. The processor 31 removes noise from the noisy image to be input using a convolutional neural network and outputs a denoise image. The processor 410 may include a neural processor according to various embodiments. The memory 420 may store instructions (or programs) that may be executed by the image processing device 400. For example, the instructions may include instructions for executing the operation of the image processing device 400 and/or the operations of each configuration of the image processing device 400.

In some embodiment, the processor 410 executes the instructions to set a noise and infer noise information from an input noisy image. The processor 410 executes the instruction to remove the noise based on the noise information from the input noisy image to generate a denoising image and to generate a reconstructed noisy image based on the noise information. For example, the noise has a normalized conditional probability distribution. For example, the noise information is an average and a standard deviation acquired using the noise and a Kullback-Leibler divergence.

In some embodiment, the processor 410 learns the noise information from a difference between the reconstructed noisy image and the input noisy image.

The image processing device 400 may process the data stored in the memory 420. The image processing device 400 may execute a computer-readable code (for example, software) stored in the memory 420 and instructions issued by the image processing device 400.

The image processing device 400 may be a data processing device that is implemented as hardware having a circuit having a physical structure for performing desired operations. For example, the desired operations may include code or instructions included in the program.

For example, data processing devices implemented by hardware may include a microprocessor, a central processing unit, a processor core, a multi-core processor, a multiprocessor, an ASIC (Application-Specific Integrated Circuit), and a FPGA (Field Programmable Gate Array).

Figure 8:
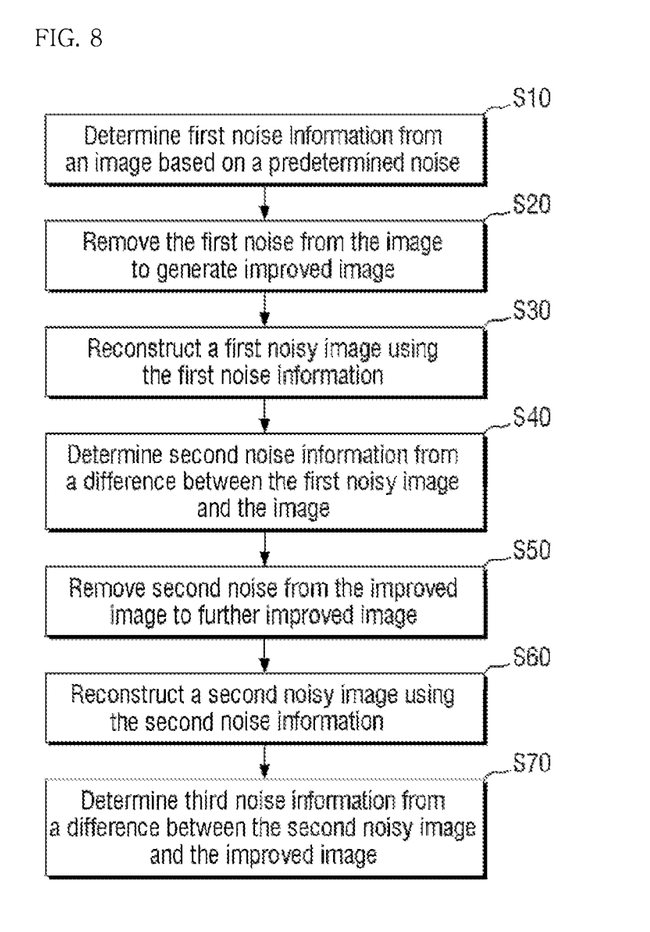
FIG. 8 is a flowchart of some embodiment of an image processing device.

FIG. 8 is a flowchart of some embodiment of an image processing device.

Referring to FIG. 8, the image processing device determines first noise information from an input noisy image based on a predetermined noise(S10). The predetermined noise is preset and stored in the image processing device.

The image processing device removes a first noise from the input noisy image and generates a first improved image (S20). The image processing device reconstructs a first noisy image using the first noise information(S30). The image processing device learns a real noise information from a difference between a reconstructed first noise image and the input noisy image.

The image processing device determines second noise information from a difference between the first noisy image and the input noisy image(S40). The image processing device removes a second noise from the input noisy image and generates a second improved image(S50). The image processing device reconstructs a second noisy image using the second noise information(S60). The image processing device learns the real noise information from a difference between a reconstructed second noise image and the input noisy image.

The image processing device determines third noise information from a difference between the second noisy image and the improved image(S70). For repeating from S10 to S70, the image processing device may learn the noise information and be more efficient for noise removal.

According to the image denoising method according to some embodiments described in FIGS. 2 to 8, losses for variationally learning the network are derived by introducing a new latent variable related to noise information and the convolutional neural network for finding the lost function is learned. Accordingly, the neural network finds the latent variable c based on the noise information through learning and continues to optimize the latent variable through the reconstructed noisy image. Such an image denoising method has an advantage that noise removal may be made more efficient even without providing additional information about the noise, when an image degradation occurs. Further, since the latent variable c is continuously learned even if various levels of noise are included in the image, denoising optimized for the noise level may be performed. Moreover, since a single neural network is used, there is an advantage that it may be realized even with a smaller memory capacity.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. An image processing device comprising:
    an encoder circuit configured to learn latent variables from an input noisy image based on a preset noise;
    a denoiser circuit configured to remove noise, based on preset latent variables, from the input noisy image to generate a denoising image; and
    a decoder circuit configured to generate a reconstructed noisy image from the denoising image using the latent variables,
    wherein the encoder circuit is configured to learn new latent variables based on a difference between reconstructed noisy image and the input noisy image,
    wherein the encoder circuit is configured to update the preset latent variables based on the new latent variables.

2. The image processing device of claim 1, wherein the noise has a normalized conditional probability distribution in the input noisy image.

3. The image processing device of claim 1, wherein the denoiser circuit is configured to generate a current step denoising image so that a peak signal-to-noise ratio is maximized in a loss between a previous denoising image and a current denoising image generated based on the latent variables.

4. The image processing device of claim 1, wherein the preset latent variables include an average noise of the input noisy image and a standard deviation of the noise of the input noisy image learned from the input noisy image using the preset noise and a Kullback-Leibler divergence.

5. The image processing device of claim 4, wherein the decoder circuit is configured to generate the reconstructed noisy image using the average and the standard deviation.

6. The image processing device of claim 1, wherein the denoiser circuit includes a plurality of Residual-In Residual (RIR) blocks and a first convolution block.

7. The image processing device of claim 6, wherein each of the plurality of RIR blocks includes:
    a plurality of residual blocks configured to be continuously connected and implemented as a rectified linear unit; and
    a second convolution block configured to connect an RIR block adjacent to the residual block.

8. The image processing device of claim 6, wherein each of the plurality of RIR blocks is connected to another of the plurality of RIR blocks by a skip connection.

9. The image processing device of claim 1, wherein the encoder circuit and the decoder circuit each comprise a feed-forward convolutional network.

10. An image processing device comprising:
    an image sensor configured to sense a first input image;
    a neural processor configured to include a plurality of convolutional neural networks and to remove noise of the first input image; and
    a memory configured to store instructions executable by the neural processor,
    wherein the neural processor is configured to infer latent variables from the first input image using an encoding convolutional neural network of the plurality of convolutional neural networks,
    wherein the neural processor is configured to remove the noise based on the latent variables using a denoising convolutional neural network of the plurality of convolutional neural networks to generate a first denoising image.

11. The image processing device of claim 10, wherein the latent variables include level and distribution information about the noise.

12. The image processing device of claim 10, wherein the denoising convolutional neural network includes:
    a plurality of Residual-In Residual blocks comprising a plurality of rectified linear units, each rectified linear unit including a plurality of residual blocks and a convolution block; and
    a convolution layer,
    wherein each of the rectified linear units is connected by a skip connection, and
    wherein each of the rectified linear units is configured to add the first input image to an output of the rectified linear unit to infer a residual image.

13. The image processing device of claim 10, wherein the encoding convolutional neural network and a decoding convolutional neural network comprise feed-forward networks.

14. The image processing device of claim 10, wherein the encoding convolutional neural network is configured to reduce a spatial size of a feature map of the first input image to a predetermined ratio and to apply a reparameterization trick to infer the latent variables.

15. The image processing device of claim 10,
wherein the neural processor is configured to generate a first reconstructed image based on the latent variables and the first denoising image using a decoding convolutional neural network,
wherein the denoising convolutional neural network is configured to re-infer the latent variables that make a mean absolute error between the first denoising image and the first reconstructed image smaller, and
wherein the denoising convolutional neural network is configured to utilize the re-inferred latent variables when performing denoising on a second input image of a next operating interval.

16. The image processing device of claim 15, wherein the denoising convolutional neural network comprises a generative adversarial network configured to minimize a Jensen-Shannon divergence between a training data set including the first input image and the first reconstructed image.

17. An image processing device comprising:
a processor; and
a memory configured to store instructions executable by the processor,
wherein the processor, in response to executing the instructions, is configured to:
set image noise,
infer noise information from an input noisy image,
remove, from the input noisy image, the image noise based on the noise information to generate a denoising image,
generate a reconstructed noisy image from the denoising image based on the noise information;
compare the reconstructed noisy image with the input noisy image; and
perform learning to learn updated noise information from a difference between the reconstructed noisy image and the input noisy image.

18. The image processing device of claim 17, wherein the image noise comprises a normalized conditional probability distribution.

19. The image processing device of claim 17, wherein the noise information comprises an average noise of the input noisy image and a standard deviation of the noise of the input noisy image acquired using the image noise and a Kullback-Leibler divergence.

* * * * *